(12) United States Patent
Friedman et al.

(10) Patent No.: US 11,131,556 B2
(45) Date of Patent: Sep. 28, 2021

(54) SYSTEM AND METHOD FOR SELECTING A POINT OF INTEREST BASED ON WAIT TIME

(71) Applicant: TOYOTA MOTOR ENGINEERING & MANUFACTURING NORTH AMERICA, INC., Erlanger, KY (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/899,712

(22) Filed: Feb. 20, 2018

(65) Prior Publication Data

US 2019/0257665 A1    Aug. 22, 2019

(51) Int. Cl.
*G01C 21/34*   (2006.01)
*G06Q 10/10*   (2012.01)
*G06Q 30/06*   (2012.01)
*G05D 1/02*    (2020.01)
*G01C 21/36*   (2006.01)
*G05D 1/00*    (2006.01)

(52) U.S. Cl.
CPC ...... *G01C 21/3476* (2013.01); *G01C 21/3415* (2013.01); *G01C 21/3484* (2013.01); *G05D 1/0088* (2013.01); *G05D 1/0276* (2013.01); *G06Q 10/1093* (2013.01); *G06Q 30/0639* (2013.01); *G05D 2201/0212* (2013.01)

(58) Field of Classification Search
USPC ............................................................ 701/26
See application file for complete search history.

(56) References Cited

U.S. PATENT DOCUMENTS

| | | | |
|---|---|---|---|
| 9,057,617 B1 * | 6/2015 | Lopatenko | G01C 21/20 |
| 9,098,929 B1 | 8/2015 | Wakim | |
| 9,546,877 B2 | 1/2017 | Suzuki et al. | |
| 9,696,175 B2 | 7/2017 | Hansen et al. | |
| 2003/0036848 A1 * | 2/2003 | Sheha | G01C 21/3679 |
| | | | 701/468 |
| 2011/0046879 A1 * | 2/2011 | Celli | G01C 21/3682 |
| | | | 701/408 |

(Continued)

*Primary Examiner* — Aniss Chad
*Assistant Examiner* — Mahmoud M Kazimi
(74) *Attorney, Agent, or Firm* — Oblon, McClelland, Maier & Neustadt, L.L.P.

(57) ABSTRACT

A method and system for selecting a point of interest are provided. The method includes receiving a user request from a vehicle user, determining a wait time for each of a plurality of points of interest, identifying a point of interest from the plurality points of interest based on the user request and the determined wait times at the plurality of points of interest, receiving a user input from the vehicle user, and updating navigation directions of a vehicle based on the identified point of interest when the user input includes an acknowledgment of the identified point of interest.

18 Claims, 5 Drawing Sheets

(56) References Cited

U.S. PATENT DOCUMENTS

| | | | |
|---|---|---|---|
| 2011/0270517 A1* | 11/2011 | Benedetti | G01C 21/20 |
| | | | 701/533 |
| 2013/0261953 A1 | 10/2013 | Kiyama et al. | |
| 2014/0309870 A1* | 10/2014 | Ricci | H04W 4/21 |
| | | | 701/36 |
| 2015/0025799 A1* | 1/2015 | Jackson | G01C 21/00 |
| | | | 701/519 |
| 2015/0168165 A1* | 6/2015 | Suzuki | G01C 21/3415 |
| | | | 701/538 |
| 2016/0169697 A1* | 6/2016 | Vecera | G01C 21/3679 |
| | | | 701/408 |
| 2017/0069000 A1* | 3/2017 | Duleba | G06F 16/23 |
| 2017/0108348 A1* | 4/2017 | Hansen | H04W 4/44 |
| 2017/0146361 A1* | 5/2017 | Lucas | G01C 21/3682 |
| 2017/0176210 A1* | 6/2017 | Jones | G01C 21/3679 |
| 2017/0331805 A1* | 11/2017 | Pham | H04L 67/18 |
| 2018/0283889 A1* | 10/2018 | Koo | G01C 21/3484 |

\* cited by examiner

SYSTEM AND METHOD FOR SELECTING A POINT OF INTEREST BASED ON WAIT TIME

BACKGROUND

Navigation systems may determine changing road situations such as traffic jam or construction and may update an optimal route to a destination accordingly. U.S. Pat. No. 9,546,877 B2 entitled "Navigation System" describes a navigation system that analyzes an objective of the user during travel and may provide a substitute destination at which the objective can be achieved.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for selecting a point of interest that receives a user request from a vehicle user, determines a wait time for each of a plurality of points of interest; identifies a POI from the plurality points of interest based on the user request and the determined wait times at the plurality of points of interest, receives a user input from the vehicle user; and updates navigation directions of a vehicle based on the identified point of interest when the user input includes an acknowledgment of the identified point of interest.

The present disclosure relates to a system for selecting a point of interest. The system includes processing circuitry. The processing circuitry is configured to receive a user request from a vehicle user, determine a wait time for a plurality of points of interests (POI), identify a point of interest (POI) from the plurality of points of interest based on the user request and the determined wait times at the points of interest, receive a user input from the vehicle user; and update navigation directions of a vehicle based on the identified point of interest when the user input includes an acknowledgment of the identified point of interest.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
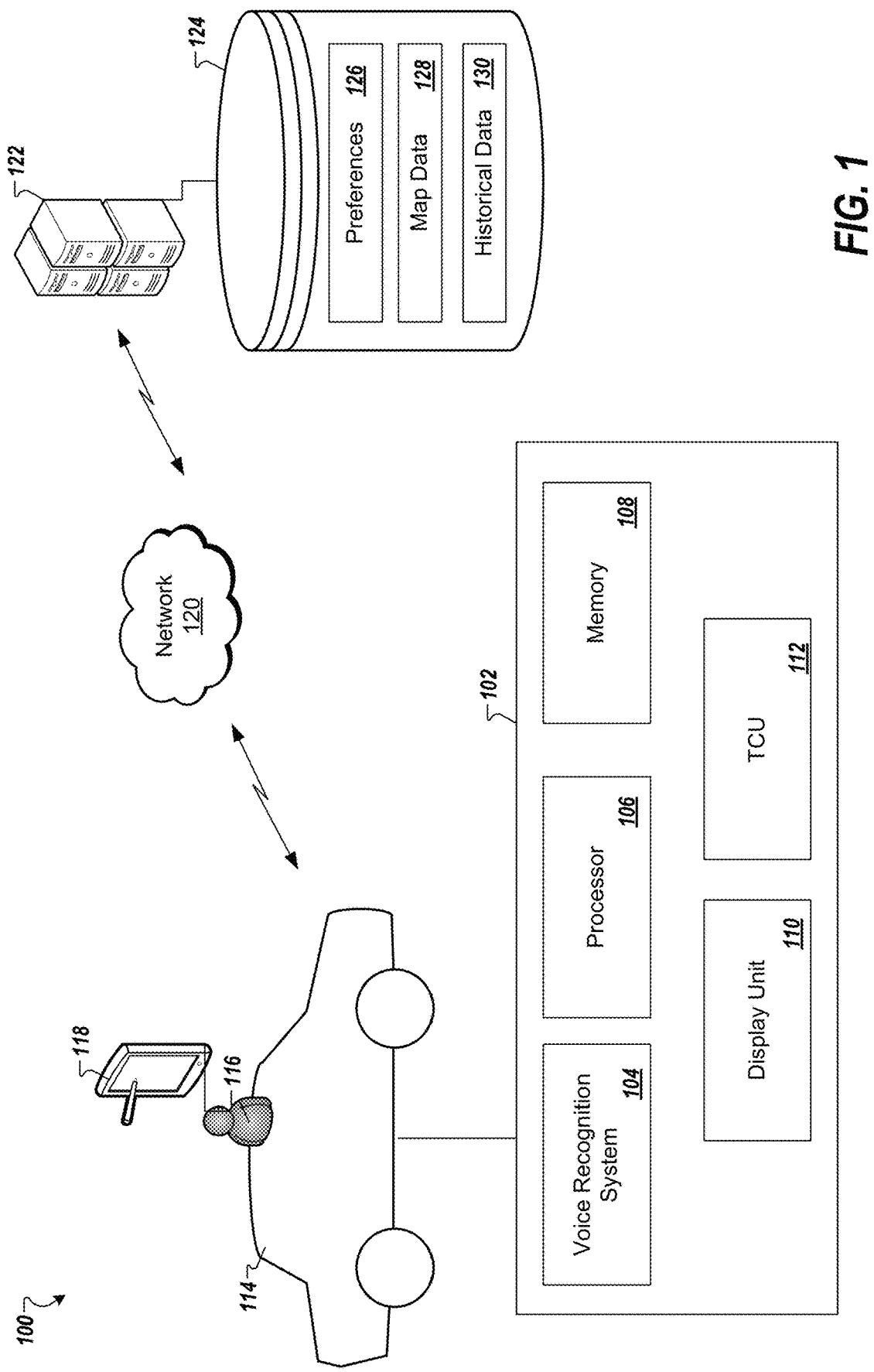
FIG. 1 is a schematic of a system environment of a system for selecting a point of interest based on wait times according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Referring now to the drawings, wherein like reference numerals designate identical or corresponding parts throughout several views, the following description relates to a system and associated methodology for identifying a point of interest based on wait times. The system also provides accurate wait times for a point of interest (POI) based on a plurality of factors.

A user may like to select a POI (e.g., a restaurant) based on an end user's schedule. For example, a user may want to go out to lunch from work and the user has only one hour to do it before the user next meeting. The user may select a popular restaurant, however, the popular restaurant may have a higher than average wait time that would actually take too long for the customer to get through the wait line, to then eat and be able to make it back in time for the meeting. Current navigation systems route to a specific destination specified by the user regardless of time constraints of the user. The system described herein identifies one or more POIs that satisfy the user's request and within the time constraints or other constraints. The POI may be a restaurant, a museum, or the like.

FIG. 1 a schematic of a system environment 100 according to one example. A vehicle 114 may be equipped with various technologies, including voice recognition, artificial intelligence, and/or machine learning. The system 102 includes a voice recognition system 104, a processor 106, a memory 108, a display unit 110, and a telemetric control unit (TCU) 112.

The vehicle 114 can be operatively connected to a user's portable communication device 118. The vehicle 114 can have access to the personal schedule/calendar of a user 116. For example, the processor 106 may retrieve a daily schedule from an electronic calendar associated with the vehicle user 116 via the user's portable communication device 118. The vehicle 114 may have also access to user preferences stored in the user's portable communication device 118.

The system 102 can search for a wait time in response to a voice input, thereby enabling a user to select a POI based on wait time. For instance, a driver may say "Take me to a restaurant on my route with low wait times." The system 102 can identify restaurants using a map application and/or any other source. The wait time can be determined using information broadcast by any suitable source (e.g., the restaurants themselves, a third party content provider). For example, the system 102 may connect via the network 120 to a server 122. The server 122 is configured to retrieve from third party providers and a database 124 information associated with the user request. The system 102 can also allow a user to provide additional parameters in the request (e.g., ratings, location, type of cuisine, etc.). The information may include attributes such as summary of user ratings, frequency of previous visits by the vehicle user, type of cuisine, and the like.

The voice recognition system 104 is configured to receive voice commands from the vehicle user 116 and to control one or more systems of the vehicle 114 based on the detected commands. The voice command may include a request to locate a POI. The voice recognition system 104 is configured to analyze the user's voice input and extracts parameters associated with the user's request. The system can be sophisticated enough to allow a user to speak in an informal manner. For instance, a user may say "I would like to grab a quick bite to eat." The system 104 can be configured to recognize certain parameters (e.g., "bite to eat"=food, "quick"=low wait times or fast food).

Historical data 130 may collect and store trends, wait times, and orders for a particular restaurant and orders. For example, the processor may determine whether the user preference is out of order or it's available as a daily special. The menu and availability may be retrieved from third party servers such as food delivery services that maintain an up to date menu. The historical data 130 may also include the individuals who where present in the previous visit to a POI. For example, the vehicle user may input "Find me a restaurant for my lunch with Alex and Jim." The processor 106 may access the database 124 to retrieve the historical data 130 to determine whether a restaurant is frequently visited by the vehicle user 116 in addition to Alex and Jim. The processor 106 may then check the wait time for the restaurant frequently visited by the vehicle user 116 with Alex and Jim. In response to determining that the wait time satisfies the time constraint of the vehicle user 116, the processor 106 may output the restaurant to the vehicle user 116. The processor 106 may also determine whether restaurants having a particular cuisine type are frequently visited by the user 116 in addition to Alex and Jim. The processor 106 may then use the particular cuisine type to identify the one or more POIs. The processor 106 may then determine the wait time for each of the identified POIs.

The database 124 may also store the preferences 126 of the vehicle user 116 such as cuisine type, minimum star rating acceptable for the vehicle user, diet restrictions, and the like. The processor 106 may use the preferences 126 when processing a user request.

The display unit 110 may provide audio and video service to the vehicle user 116. The display unit 110 may also provide navigation services. The display unit 110 may output (e.g., audio or text) the identified one or more POIs. In addition, the display unit 110 may display navigation directions to the one or more POIs. The display unit 110 may receive inputs from the vehicle user 116 via one or more user interfaces (e.g., console display, dash display). The user interface may include buttons, a multiple touch input device, a microphone, and speakers.

The TCU 112 may be a direct communication module (DCM) that provides communications over a network 120 to any server (e.g., server 122). For example, the processor 106 may retrieve via the TCU 112 the electronic calendar of the vehicle user 116. The network 120 may be a cellular network.

The cellular network may include a plurality of base stations that are configured to receive and transmit data over wired systems such as public switched telephone network (PSTN) and backhaul networks. The cellular network can include wide area networks, metropolitan area networks, the Internet, satellite networks, or the like. Thus, the base stations include one or more antennas, transceivers, and processors that execute machine readable instructions to exchange data over various wired and/or wireless networks.

The modules and engines described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

The system described herein can provide highly accurate wait times to the vehicle user 116. In addition to the travel time for a current location to a POI in view of current traffic levels, the system 102 can also take into account the time it takes to park, to walk from the parking lot to the POI, and the wait time at the POI. Some POIs (e.g., restaurants, bars, and/or clubs) broadcast their wait time, or there may be third party content providers that determine current wait times at the POI. Such information can be accessed by the vehicle 114 and used to determine a more accurate wait time.

The system 102 can be configured to take into account a user's other tasks for the day when identifying a suitable POI. For instance, the system can access the user's schedule/calendar. If the user has a meeting or other appointment in 45 minutes, then such information can be considered as described previously herein.

Further, the vehicle 114 using the processor 106 can identify local services that have people wait in line at the POI for your behalf. The vehicle 114 via the display unit 110 can prompt the vehicle user 116 if he or she would like to use such a service to as to minimize the wait once they arrive at the POI.

Further, the system 102 described herein may predict a category of a POI based on the previous trips of the user. The system 102 may associate a day of the week with a type of food. For example, the system 102 may remember (e.g., from historical data 130) that the vehicle user 116 eats Thai food every Tuesday. In one example, the system 102 may check to see whether the regular Thai restaurant has a higher than normal wait. In response to determining that the usual Thai restaurant has a longer than usual wait, the system 102 may identify another Thai restaurant with a lower wait time. The processor 106 may output via the display unit 110 a message informing the vehicle user 116 that the regular Thai restaurant is busy today and may suggest the identified Thai restaurant. In one example, the user request may include a time constraint. The user may input via the microphone "I have two hours to go and hang out with my friends, what options do I have?"

Figure 2:
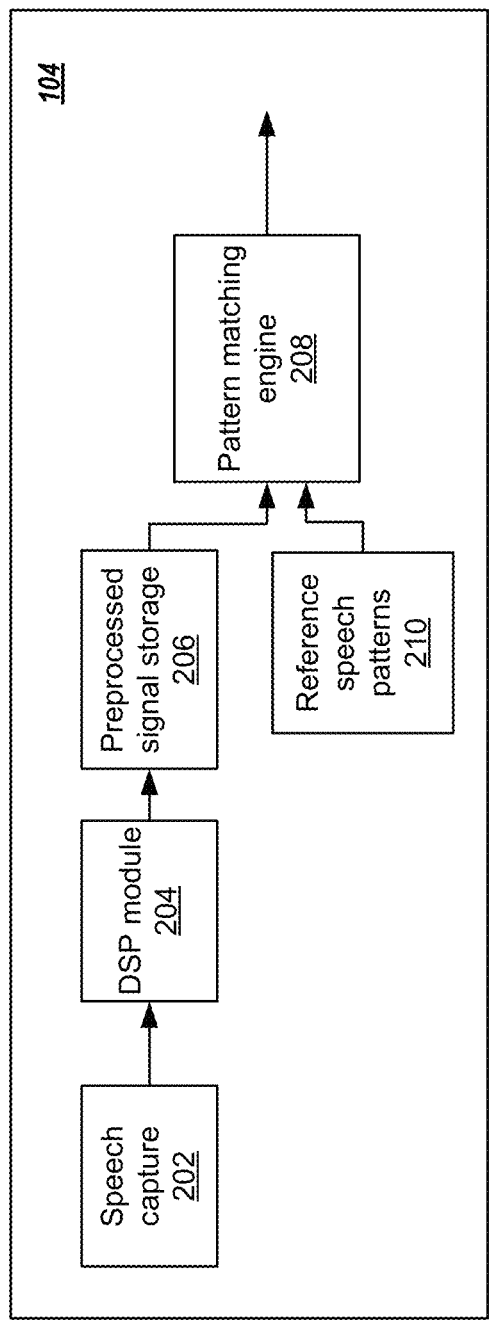
FIG. 2 is a block diagram of a voice recognition system according to one example.

FIG. 2 is a block diagram of the voice recognition system 104 according to one example. The voice recognition system 104 may include a speech capture device 202, a digital signal processing (DSP) module 204, a preprocessed signal database 206, a pattern matching engine 208 (e.g., Hidden Markov Models, Neural Network, Deep feedforward Neural Network), and a reference speech patterns database 210. The pattern matching engine 208 may execute one or more pattern matching algorithms to detect a recognized word or an alternative. The speech capture device 202 may be the microphone included in the display unit 110. The pattern matching engine 208 may analyze phonemes in a context. For example, the pattern matching engine 208 may compare the phonemes to a large library of known words, phrases, and sentences stored in the reference speech pattern database 210. The voice recognition system 110 then determines what contents the vehicle user 116 was probably saying.

Figure 3:
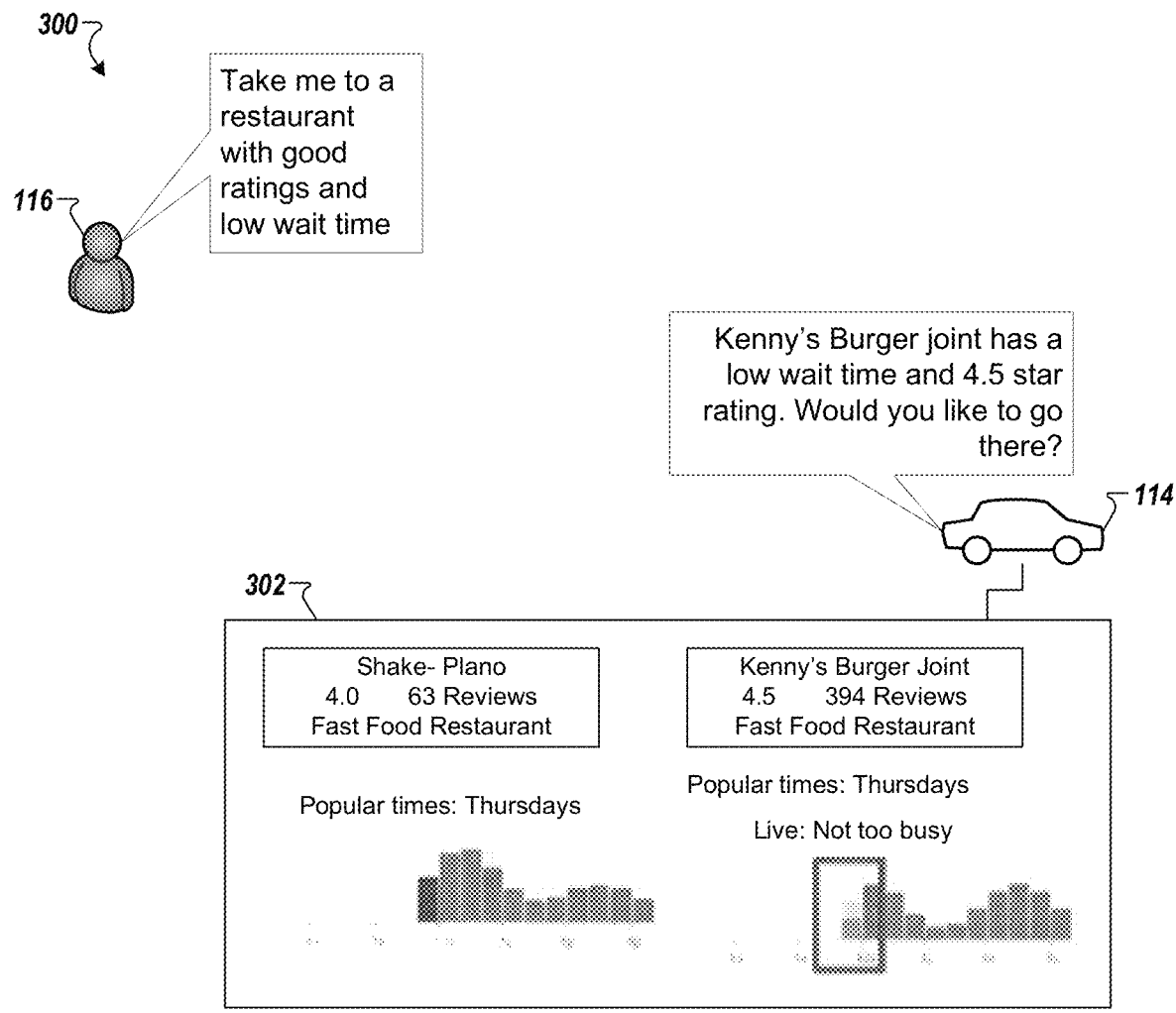
FIG. 3 is a schematic that shows an illustration of the output of the system according to one example.

FIG. 3 is a schematic that shows an illustration 300 of the operation of the system according to one example. The vehicle user 116 may say "Take me to a restaurant with good ratings and low wait time." The system 102 determines a current location of the vehicle 114. Then, the system 102 identifies one or more POIs that satisfy the user request using historical data 130 and the preferences 126 of the user. For example, the system 102 may search for POIs that satisfy the user request within a predetermined distance from the current location of the vehicle 114 (e.g., 3 miles, 5 miles, 10 miles). As shown by 302, the system 102 may identify two POIs that satisfy the user request. The system 102 may select the POI with the highest ranking. For example, the system 102 may output to the user via audio "Kenny's burger joint has a low wait time and 4.5 star rating. Would you like to go there?"

Figure 4:
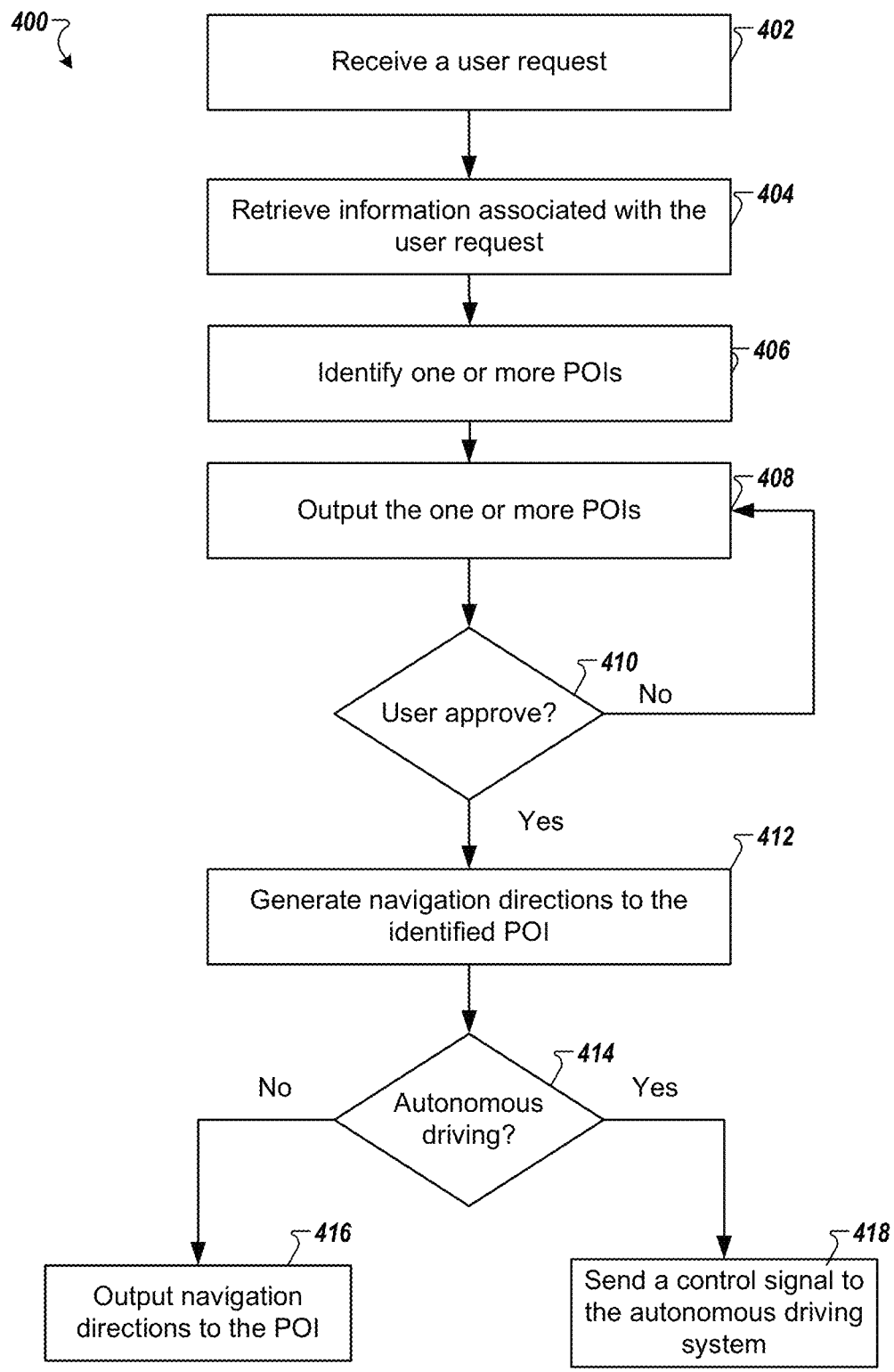
FIG. 4 is a flowchart of a method for selecting a point of interest based on wait times according to one example.

FIG. 4 is a flowchart of a method 400 for selecting a POI based on wait time according to one example. At step 402, the system 102 may receive a user request for a POI. The system 102 may also analyze the electronic calendar associated with the vehicle user to determine whether to select a POI.

At step 404, the processor 106 may retrieve information associated with the user request from the database 124 and/or from one or more third party providers. The information may include historical data 130 and the preferences 126 of the vehicle user 116.

At step 406, the processor 106 may identify one or more POIs based on the user request and the information retrieved at step 404. The processor 106 may identify the one or more POIs based on a total time associated with the POI.

In one example, the processor 106 determines the total time based on the travel time, wait time, and time spent in the restaurant. The time in the restaurant may be an average time spent in the restaurant obtained from third party providers or an average time the vehicle user spent in the restaurant based on historical data 130.

At step 408, the processor 106 may output a list of one or more POIs. In one implementation, when the user request includes a POI, the processor 106 may output an alternative POI when the POI specified by the user does not satisfy a constraint such as a time constraint.

In one implementation, the processor 106 may retrieve from the electronic calendar of the vehicle user a future appointment at a particular restaurant. The processor 106 may monitor wait times for a predetermined period (e.g., 4 days, one week) in advance to determine a wait time. Further, the processor 106 may then suggest the departure time and may also output a message to the user to check whether the user wants to put reservations. Further, in response to determining that the wait time based on the trend is higher than a predetermined period (e.g., 20 mins), the processor 106 may identify another location. The predetermined period may be set by the vehicle user.

At step 410, the processor 106 may determine whether an acknowledgment is received from the vehicle user 116. In response to determining that the vehicle user 118 agrees with the POI resulting in a "yes" at step 410, the process proceeds to step 412. In response to determining that the user vehicle does not agree with the POI or a user input is not received, the process may go back to step 408.

The historical data 130 may also store a count corresponding to the number of times the vehicle user 114 rejects a particular POI. The processor 106 may identify based on the count. For example, the processor may select POI having the lowest count from the identified POIs that satisfy the user request.

At step 412, the processor 106 may generate navigation directions to the identified POI based on the map data 128.

At step 414, the processor 106 may check to see whether an autonomous driving mode of the vehicle 114 is activated. In response to determining that the autonomous driving mode of the vehicle 114 is active, resulting in a "yes" at step 414, the process proceeds to step 418. In response to determining that the autonomous driving mode is not activated resulting in a "no" at step 414, the process proceeds to step 416. At step 418, the processor 106 may send a control signal to the autonomous driving system of the vehicle 114 causing the autonomous driving system to update a destination based on the identified POI.

At step 416, the processor may output via the display unit 110 the navigation directions generated at step 412.

In one implementation, the processor 106 may output a notification to the electronic device or to the display unit if the user is within the vehicle indicating a modified departure time based on the wait time.

Figure 5:
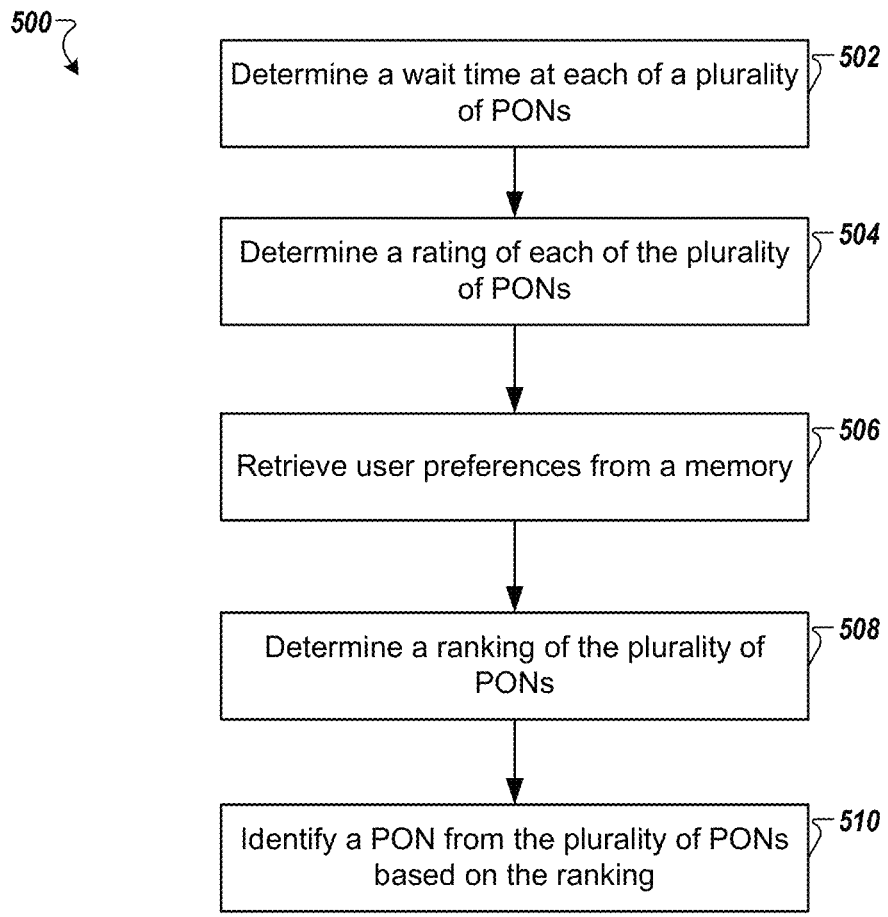
FIG. 5 is a flowchart of a method for identifying a point of interest according to one example.

FIG. 5 is a flowchart of a method 500 for identifying the POI according to one example. At step 502, the processor 106 may determine a wait time at each of a plurality of PONs as described previously herein. At step 504, the processor 106 may determine a rating of each of the plurality of PONs. For example, the processor 106 may retrieve the rating of each of the plurality of PONs from third party providers. In one implementation, the processor 106 may compute the rating based on users' reviews.

At step 506, the processor 106 may check to see whether the vehicle user has a preference. For example, the vehicle user may value a low wait time over rating. Thus, at step 508, the processor 106 may determine a ranking of the plurality of PONs based on wait times, ratings, and other factors by determining a score for each of the plurality of PONs. The score may be determined using a weighted formula based on the preference of the vehicle user. In one implementation, in response to determining that the user has no preference, the processor 106 may use equal weight for all factors. At step 510, the processor 106 may identify the PON from the plurality of PONs based on the ranking. For example, the processor 106 may select the PON with the highest score.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for selecting a point of interest, the method comprising:
receiving a user request from a vehicle user including a point of interest type and user constraints;
identifying a plurality of points of interest (POI) that corresponds to the point of interest type;
determining a wait time for each point of interest of the plurality of points of interest;
identifying, using processing circuitry, a POI from the plurality points of interest that satisfies the user constraints based on the determined wait times at each point of interest of the plurality of points of interest;
receiving, using the processing circuitry, a user input from the vehicle user; and
updating, using the processing circuitry, navigation directions of a vehicle based on the identified point of interest when the user input includes an acknowledgment of the identified point of interest, wherein the user constraints include individuals visiting the POI in addition to the vehicle user, and identification of items for sale at the POI received from the POI, and
identifying the plurality of POI is based on a frequency of visiting the POI,
wherein the user constraints include a time constraint and the plurality of POI are identified, at least in part, based on the time constraint, and
wherein the method further includes updating a count when the vehicle user rejects the identified point of interest, identifying a subsequent POI as a POI having a lowest count.

2. The method of claim 1, further comprising:
outputting a control signal to an autonomous driving system of the vehicle causing the autonomous driving system to update a destination to correspond to the point of interest.

3. The method of claim 1, wherein the determining the wait time comprises:
monitoring a wait time at a first POI;
determining a predicted wait time based on the monitoring; and
identifying a second POI when the predicted wait time of the POI exceeds a predefined value.

4. The method of claim 3, wherein the predefined value is determined based on information retrieved from an electronic calendar associated with the user.

5. The method of claim 1, further comprising:
determining a current location of the vehicle;
determining a total time based on the wait time, a travel time from a current location of the vehicle to a POI, and an average time spent at the POI; and
wherein identifying the POI is based on the total tune.

6. The method of claim 1, further comprising:
retrieving a daily schedule from an electronic calendar associated with the vehicle user; and
wherein identifying the POI is based on the daily schedule.

7. The method of claim 1, wherein identifying the POI includes retrieving preferences and historical data associated with the vehicle user.

8. The method of claim 7, wherein the POI is a restaurant.

9. The method of claim 8, wherein the preferences includes a type of cuisine.

10. The method of claim 8, wherein historical data includes past visited restaurants, individuals who were present in a previous visit to the restaurant, and a total time spent at the restaurant.

11. A system for selecting a point of interest, the system comprising:
processing circuitry configured to
receive a user request from a vehicle user including a point of interest type and user constraints;
identifying a plurality of points of interest (POI) that corresponds to the point of interest type;
determine a wait time for each point of interest of the plurality of points of interest;
identify a POI from the plurality of points of interest that satisfies the user constraints based on the determined wait times at each point of interest of the plurality of the points of interest;
receive an user input from the vehicle user; and
update navigation directions of a vehicle based on the identified point of interest when the user input includes an acknowledgment of the identified POI, wherein the user constraints include individuals visiting the POI in addition to the vehicle user, and identification of items for sale at the POI received from the POI, and
identifying the plurality of POI is based on a frequency of visiting the POI,
wherein the user constraints include a time constraint and the plurality of POI are identified, at least in part, based on the time constraint,
wherein the processing circuitry is further configured to update a count when the vehicle user rejects the identified point of interest, identify a subsequent POI as a POI having a lowest count.

12. The system of claim 11, wherein the processing circuitry is further configured to:
output a control signal to an autonomous driving system of the vehicle causing the autonomous driving system to update a destination to correspond to the identified point of interest.

13. The system of claim 11, wherein the processing circuitry is further configured to:
monitor a wait time at a first POI;
determine a predicted wait time based on the monitoring; and
identify a second POI from the plurality of points of interest when the predicted wait time of the identified POI exceeds a predefined value.

14. The system of claim 13, wherein the predefined value is determined based on information retrieved from an electronic calendar associated with the user.

15. The system of claim 11, wherein the processing circuitry is further configured to:
determine a current location of the vehicle;
determine a total time based on the wait time for each of the plurality of POIs, a travel time from a current location of the vehicle to each of the plurality of POIs, and an average time spent at each of the plurality of POIs; and
wherein identifying the POI is based on the total time for each of the plurality of POIs.

16. The system of claim 11, wherein the processing circuitry is further configured to:
retrieve a daily schedule from an electronic calendar associated with the vehicle user; and wherein identifying the POI is based on the daily schedule.

17. The system of claim 11, wherein identifying the POI includes retrieving preferences and historical data associated with the vehicle user.

18. A non-transitory computer readable medium storing computer-readable instructions therein which when executed by a computer cause the computer to perform a method for selecting a point of interest, the method comprising:

receiving a user request from a vehicle user including a point of interest type and user constraints;

identifying a plurality of points of interest (POI) that corresponds to the point of interest type;

determining a wait time for each point of interest of the plurality of points of interest;

identifying a POI from the plurality of points of interest that satisfies the user constraints based on the determined wait times at each point of interest of the plurality of points of interest;

receiving a user input from the vehicle user; and updating navigation directions of a vehicle based on the identified point of interest when the user input includes an acknowledgment of the identified POI, wherein the user constraints include individuals visiting the POI in addition to the vehicle user, and identification of items for sale at the POI received from the POI, and identifying the plurality of POI is based on a frequency of visiting the POI, wherein the user constraints include a time constraint and the plurality of POI are identified, at least in part, based on the time constraint, and wherein the method further includes updating a count when the vehicle user rejects the identified point of interest, identifying a subsequent POI as a POI having a lowest count.

\* \* \* \* \*